US008566255B2

(12) United States Patent
Bonnell et al.

(10) Patent No.: US 8,566,255 B2
(45) Date of Patent: Oct. 22, 2013

(54) SYSTEM AND METHOD FOR ELECTRONIC TRANSACTION VERIFICATION

(75) Inventors: Clayton Bonnell, Fairfax, VA (US); Ronald Garey, Mitchellville, MD (US); Bradley Reck, Sterling, VA (US); Gregory Crabb, Broadlands, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 13/524,870

(22) Filed: Jun. 15, 2012

(65) Prior Publication Data

US 2012/0254059 A1 Oct. 4, 2012

Related U.S. Application Data

(62) Division of application No. 12/016,865, filed on Jan. 18, 2008, now Pat. No. 8,214,302.

(60) Provisional application No. 60/881,249, filed on Jan. 19, 2007.

(51) Int. Cl.
*G06Q 30/00* (2012.01)
(52) U.S. Cl.
USPC .................. 705/330; 705/38; 705/39; 726/28
(58) Field of Classification Search
USPC ..................................... 705/33 X, 38, 39, 408
See application file for complete search history.

(56) References Cited

U.S. PATENT DOCUMENTS

| | | | | |
|---|---|---|---|---|
| 5,008,827 A * | 4/1991 | Sansone et al. | ............... | 705/409 |
| 5,737,729 A | 4/1998 | Denman | | |
| 5,774,882 A * | 6/1998 | Keen et al. | ....................... | 705/38 |
| 5,883,810 A * | 3/1999 | Franklin et al. | ................ | 700/232 |
| 6,938,023 B1 * | 8/2005 | Ryan et al. | ..................... | 705/408 |
| 7,096,192 B1 | 8/2006 | Pettitt | | |
| 7,797,199 B2 | 9/2010 | Forshaw et al. | | |
| 8,214,302 B2 | 7/2012 | Bonnell et al. | | |
| 2002/0059430 A1* | 5/2002 | Orbke et al. | ................... | 709/227 |
| 2003/0126036 A1 | 7/2003 | Mascavage, III et al. | | |
| 2003/0172272 A1 | 9/2003 | Ehlers et al. | | |
| 2003/0200184 A1 | 10/2003 | Dominguez et al. | | |
| 2004/0019563 A1* | 1/2004 | Sines et al. | ....................... | 705/42 |

(Continued)

FOREIGN PATENT DOCUMENTS

WO   WO 2004/107219   *   9/2004

OTHER PUBLICATIONS

"Giving Postage Its Due", Printing Impressions, v48n12, May 2006.
"Do I know you?", Economic Times, Aug. 12, 2006.

*Primary Examiner* — Brian Epstein
(74) *Attorney, Agent, or Firm* — Knobbe Martens Olson & Bear LLP

(57) ABSTRACT

A system and method for authenticating a physical address submitted in an online communication is disclosed. An online communication comprising a physical address to be verified is received. A verification identification (VID) is requested and received. A transaction verification document (TVD) comprising an indicia indicative of the VID is generated. An electronic copy of the TVD is transmitted. Verification data produced in response to dispatch of a physical embodiment of the TVD is received, wherein the physical embodiment is generated from the electronic copy. The physical address is authenticated based at least in part on the verification data.

21 Claims, 9 Drawing Sheets

(56) References Cited

U.S. PATENT DOCUMENTS

| | | | |
|---|---|---|---|
| 2004/0088245 A1* | 5/2004 | Narayan et al. | 705/38 |
| 2004/0215579 A1* | 10/2004 | Redenbaugh et al. | 705/78 |
| 2005/0021551 A1* | 1/2005 | Silva et al. | 707/102 |
| 2005/0131813 A1* | 6/2005 | Gallagher et al. | 705/39 |
| 2005/0242188 A1* | 11/2005 | Vesuna | 235/462.46 |
| 2006/0026097 A1 | 2/2006 | Nethery, III | |
| 2006/0259440 A1 | 11/2006 | Leake et al. | |
| 2007/0174208 A1* | 7/2007 | Black et al. | 705/75 |
| 2008/0066188 A1* | 3/2008 | Kwak | 726/28 |
| 2008/0127331 A1 | 5/2008 | Seidman et al. | |
| 2008/0147652 A1 | 6/2008 | Kirkpatrick et al. | |

* cited by examiner

SYSTEM AND METHOD FOR ELECTRONIC TRANSACTION VERIFICATION

CROSS-REFERENCE TO RELATED APPLICATIONS

This application is a divisional of U.S. application Ser. No. 12/016,865, entitled "System and Method for Electronic Transaction Verification, filed on Jan. 18, 2008, which claims the benefit under 35 U.S.C. 119(e) of U.S. Provisional Application No. 60/881,249, entitled "Electronic Transaction Verification," filed on Jan. 19, 2007. The entire disclosure of each of the above-referenced applications is hereby incorporated by reference in its entirety.

BACKGROUND OF THE INVENTION

1. Field of the Invention

The field of the invention relates to verifying electronic transactions, and more specifically, to authenticating physical address submitted in an online communication.

2. Description of the Related Art

Institutions, such as banks, eMerchants, insurance companies, and government agencies, increasingly offer online transactions to their customers. Customers like the convenience and choices offered by the online transactions, and the institutions like the simplified transactions and/or increased revenues. Online transactions often require a new customer to apply for enrollment which may include applying for a credit card or deposit account, for example. To apply for the enrollment, an online applicant typically transmits his or her personal information such as name, address, social security number, date of birth, and the like via the Internet. With the rise of the online transactions, however, there is a growing concern regarding fraud. Identity thieves can steal or otherwise gain access to personal information of a victim and use the information to fraudulently obtain an enrollment in a membership, e.g., a credit card account, under the victim's name. With widespread technologies, a victim can fall prey to fraudsters operating anywhere in the country or even anywhere in the world who can obtain the personal information of the victim.

Accordingly, a reliable electronic transaction verification scheme that can reduce or deter such Internet-based fraud is desirable.

SUMMARY OF THE INVENTION

The system, method, and devices of the invention each have several aspects, no single one of which is solely responsible for its desirable attributes. Without limiting the scope of this disclosure, its more prominent features will now be discussed briefly. After considering this discussion, and particularly after reading the section entitled "Detailed Description of Certain Embodiments" one will better understand how the features of these embodiments are distinguished from other methods and systems which may be used to determine the quality of an imaging process.

In one embodiment, there is a method of authenticating a physical address submitted in an online communication, the method comprising receiving an online communication, wherein the online communication comprises a physical address to be authenticated; requesting and receiving a verification identification (VID); generating a transaction verification document (TVD) comprising an indicia indicative of the VID; transmitting an electronic copy of the TVD; receiving verification data produced in response to dispatch of a physical embodiment of the TVD, the physical embodiment generated from the electronic copy; and authenticating the physical address based at least in part on the verification data.

In another embodiment, there is a method of authenticating a physical address in an online communication, the method comprising receiving a request for a verification identification (VID), transmitting the VID, receiving a physical embodiment of a transaction verification document (TVD) comprising an indicia indicative of the VID, extracting the VID from the physical embodiment, generating verification data comprising one or more data elements indicative of the VID, and transmitting the verification data.

In another embodiment, there is an apparatus for authenticating a physical address in an online communication, the apparatus comprising at least one processor configured to receive a request for a verification identification (VID) from an institution, and transmit an indicia indicative of the VID to the institution; and one or more readers configured to extract one or more data elements indicative of the VID from a physical embodiment of a transaction verification document (TVD), wherein the at least one processor is further configured to generate verification data comprising the one or more data elements, and transmit the verification data to the institution.

In another embodiment, there is an apparatus for authenticating a physical address in an online communication, the apparatus comprising means for receiving a request for a verification identification (VID) from an institution, means for transmitting an indicia indicative of the VID to the institution, means for extracting one or more data elements indicative of the VID from a physical embodiment of a transaction verification document (TVD), means for generating verification data comprising the one or more data elements, and means for transmitting the verification data to the institution.

In another embodiment, there is an apparatus for authenticating a physical address submitted in an online communication, the apparatus comprising at least one processor configured to receive an online communication, wherein the online communication comprises a physical address to be authenticated, request and receive a verification identification (VID), generate a transaction verification document (TVD) comprising an indicia indicative of the VID, transmit an electronic copy of the TVD, receive verification data generated in response to a physical embodiment of the TVD generated from the electronic copy, and authenticate the physical address based at least in part on the verification data; and at least one memory configured to store the physical address to be verified and the verification data.

In another embodiment, there is an apparatus for authenticating a physical address submitted in an online communication, the apparatus comprising means for receiving an online communication, wherein the online communication comprises a physical address to be authenticated, means for requesting and receiving a verification identification (VID), means for generating a transaction verification document (TVD) comprising an indicia indicative of the VID, means for transmitting an electronic copy of the TVD, means for receiving verification data generated in response to a physical embodiment of the TVD generated from the electronic copy, means for authenticating the physical address based at least in part on the verification data, and means for storing the physical address to be verified and the verification data.

DETAILED DESCRIPTION OF THE PREFERRED EMBODIMENT

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Certain embodiments of the invention can be used to authenticate one or more physical addresses submitted in an online application. Such physical address verification is part of an electronic transaction verification system intended to prevent or deter an identity theft on the Internet. In one form of an identity theft, an identity thief can obtain personal information of a victim such as name, physical address, data of birth, social security number, and the like, and submit an online application for an enrollment with a program or service offered by an institution using the personal information of the hapless victim. Oftentimes, the identity thief operates in a geographical location that is different from the residential or work location of the victim. For example, the victim can reside and work in San Diego, Calif., while the identity thief operates in Newark, N.J. or Abuja, Nigeria. This fact leads to the observation that one way of preventing or deterring such form of identity theft is to authenticate that the applicant that submitted the application indeed resides or works at the physical address indicated in the application. Of course, one way of achieving this objective is to cross check the submitted physical address against the address for the named applicant stored in an existing address database. However, such cross checking against an existing address database does not provide protection against an identity thief who has obtained the correct address of the victim. A far more robust way to authenticate the submitted physical address is to require the applicant to dispatch a mail item bearing a unique verification identifier and to subsequently check location data indicative of the dispatch location such as the location where the mail item was collected or processed.

Figure 1:
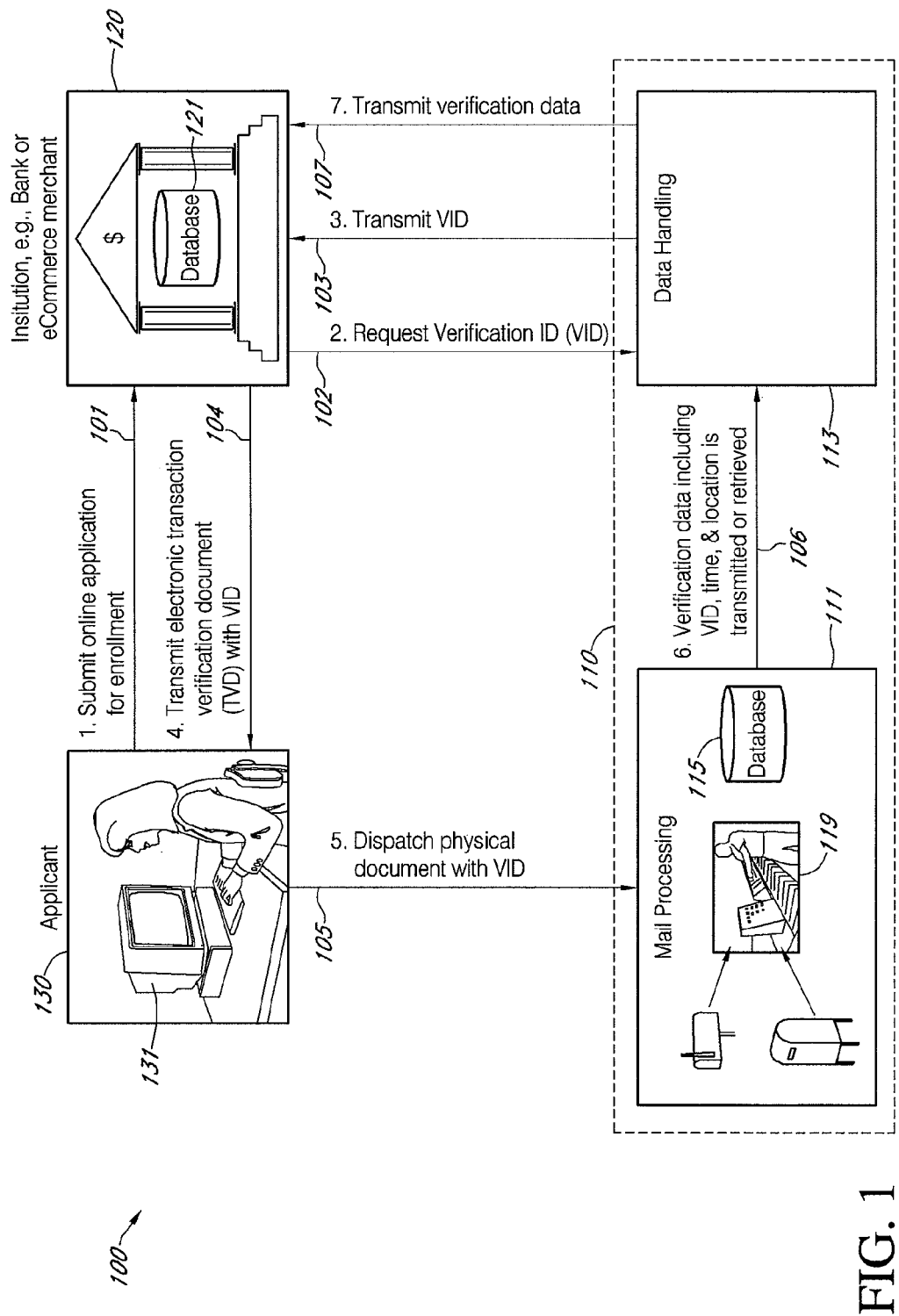
FIG. 1 is a system overview and dataflow diagram illustrating an example of an electronic transaction verification (ETV) system for authenticating a submitted physical address according to certain embodiments.

FIG. 1 is a system overview and dataflow diagram illustrating an example of an electronic transaction verification (ETV) system for authenticating a submitted physical address according to certain embodiments. The figure shows a delivery service 110, an institution 120, and an applicant 130. The delivery service 110, e.g. a postal service, includes a mail processing unit 111 and a data handling unit 113. The mail processing unit 111 includes a local mail processing center 119. The local mail processing center 111 performs a number of mail processing functions relating to ETV including sorting of mail that includes a physical embodiment of transaction verification document (TVD) dispatched by the applicant, extracting a verification ID (VID) from the physical embodiment, and generating verification data to be used for authenticating the submitted physical address. The mail processing unit 111 also includes an indicia database 115 configured to store data collected from indicia printed on mail items that are processed at various local mail processing centers in a region or a country.

The data handling unit 113 performs a number of data handling functions relating to ETV including receiving a request for the VID from the institution 120, transmitting the VID to the institution, and retrieving and transmitting the verification data stored in the indicia database 115 to the institution 120. The institution 120 is a commercial or non-commercial entity that accepts online applications for enrollment into a program or service that it offers. For example, the institution 120 can be, among many other things, a bank offering a credit card and deposit accounts, an eMerchant offering a customer transaction account, a government agency offering social services such as welfare or Medicaid, an insurance company offering insurance services such as auto and health insurances. The institution 120 is previously registered with the delivery service 110 for participation in the ETV system. The institution 120 can include a customer database 121 for storing, among other things, personal information submitted by online applicants.

In operation, the applicant 130 submits an online enrollment application via a personal computer 131 connected to the Internet as illustrated by arrow 101. The online application includes personal information of the applicant including the name and the physical address to be verified by the ETV system. After receiving the application, the institution 120 requests a unique verification ID (VID) from the data handling unit 113 of the delivery service 110 as illustrated by arrows 102. The data handling unit 115 transmits the VID to the registered institution as illustrated by arrow 103. In some embodiments, the VID is transmitted as part of a printable ETV postage such as the one shown in FIG. 2. After receiving the VID, the institution 120 stores the VID along with the personal information submitted by the applicant in the customer database 121. The institution also generates a transaction verification document (TVD) which comprises data indicative of the VID. In some of such embodiments, the TVD includes a printable ETV postage comprising coded data indicative of the VID. In other embodiments, the TVD includes delivery service payment data such as postage or other delivery payment indicia. In some of such embodiments, the delivery payment indicia includes the VID. In other embodiments, the VID are provided on the TVD separate from the postage or other delivery payment indicia. After the TVD is generated, the institution transmits an electronic copy the TVD to the online applicant 130 as illustrated by arrow 104. Various embodiments of the electronic copy of the TVD is described with reference to FIG. 7 below.

After receiving the electronic copy of the TVD, the applicant 130 generates a physical embodiment of the TVD by printing the electronic copy. After generating the physical embodiment, the applicant dispatches the physical embodiment as a mail item as illustrated by arrow 105. The dispatched physical embodiment is collected and brought into a local mail processing center 119, where the VID printed on the physical embodiment is extracted via a barcode reader, for example. The local mail processing center also generates verification data comprising the VID, location data, and time data. The location data is intended to be indicative of the dispatch location of the physical embodiment. The time data is intended to be indicative of the dispatch time of the physical embodiment. In certain embodiments, the location data includes a postal zip code of the local mail processing center. In other embodiments, the location data can include a postal zip code of a collection point, e.g., a residential mail box or a postal collection station, where the dispatched physical embodiment was collected and scanned. The time data can include the time when the physical embodiment was processed, e.g., scanned, at the local mail processing center or at the collection point. The verification data thus generated is stored in the indicia database 115. The verification data is also transmitted to or retrieved by the data handling unit 113 as illustrated by arrow 106. The verification data is then transmitted to the institution as illustrated by arrow 107. The registered institution verifies the physical address submitted by the online applicant at least in part based on the verification data.

A variety of other arrangements for the ETV system is possible. For example, in certain embodiments, the data handling unit 113 is not part of the delivery service 110, but instead its subcontractor hired to handle communication of ETV-related data with registered institutions. In some embodiments, the verification data comprising the VID, the location data, and the time data, is generated by a mail carrier when he or she picks up and scans the physical document via a handheld barcode reader. In yet other embodiments, the institution 120 receives the printable postage comprising data indicative of the VID from an intermediary who is authorized to issue postages. In yet other embodiments, the printable postage or a document comprising the printable postage can be transmitted directly from the mail delivery service to the applicant with instructions to print and dispatch an ETV mail.

While FIG. 1 illustrates an ETV system involving an online enrollment application, the illustrated ETV system can be generalized to any online communications in which an communicant transmits a physical address to be verified to an organization. The organization can include any institution or entity that has a need to authenticate a physical address transmitted by the communicant. Such organizations can include, besides the institutions described above, schools that need to verify addresses of prospective students and a security clearance services that need to verify the physical address of people seeking security clearance for government jobs, for example.

Figure 2:
FIG. 2 shows an example of the printable postage that includes the verification ID (VID) associated with an online application according to certain embodiments.

FIG. 2 shows an example of the printable ETV postage 200 that includes the verification ID (VID) associated with an online application and transmitted to the registered institution according to certain embodiments. The particular printable ETV postage shown in FIG. 2 is Information Based Indicia (IBI) postage of the United States Postal Service (USPS). The printable ETV postage can include a coded data that is indicative of the VID which uniquely corresponds to an online enrollment application received by a registered institution. The printable ETV postage 200 can include a non-human readable coded data. In certain embodiments, the coded data indicative of the VID includes IBI data. In other embodiments, the coded data indicative of the VID includes Intelligent Mail Barcode®. The example postage 200 includes a barcode 210 comprising the IBI data. The IBI data can include a plurality of barcoded data elements including a licensing zip code, a destination delivery point, a software ID, an ascending register, a descending register, an algorithm ID, a device ID, a date of mailing, a postage, a digital signature, a rate category, a reserved field, an indicia version number, and a certificate serial number. The VID can comprise one or more of the barcoded data elements. For example, the ascending register and/or the descending register can comprise the VID that uniquely corresponds to the online application. The printable ETV postage 200 can also include human readable coded data 220. In certain embodiments, one or more human readable coded data can comprise the VID. In some embodiments, the human readable coded data can be machine readable.

Figure 3:
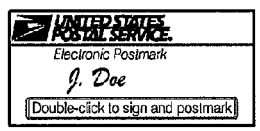
FIG. 3 shows an example of an ETV mail item 300 dispatched by the online applicant according to certain embodiments.
Figure 3:
Figure 3:
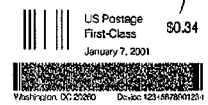
Figure 3:

FIG. 3 shows an example of an ETV mail item 300 dispatched by the online applicant according to certain embodiments. An electronic transaction verification (ETV) mail is a physical mail that includes a VID for uniquely identifying an online transaction, e.g., online enrollment application. In the example, the ETV mail item is a physical embodiment of the TVD that is generated from an electronic copy of the TVD, e.g., a pdf document, transmitted to the applicant from the institution 102. The physical embodiment includes a printable ETV postage 200 such as the one shown in FIG. 2, a sender's address 220, and a recipient's address 300. In the example, the sender's address 220 corresponds to the to-be-verified physical address of the applicant, while the recipient's address 330 corresponds to the address of the registered institution. The physical embodiment also includes content 310 directed to the applicant. The content includes a signature line 311 to which the online applicant is instructed to add his or her signature 313. As the content 310 states, the signature is required for the applicant to be eligible for the institution's product or service (e.g., Internet Banking Service). The signature 313 provided by the applicant also can be used as an extra verification element by the ETV system. For example, if the registered institution has a verified signature of the applicant on file from prior dealings with the applicant, for example, the applicant-provided signature 313 can be verified against the signature on file. The physical embodiment also includes fold lines 340. After printing, signing, folding, and sealing the physical embodiment, the applicant can dispatch the physical embodiment at a mail collection point at or near his or her residence or work.

Figure 4:
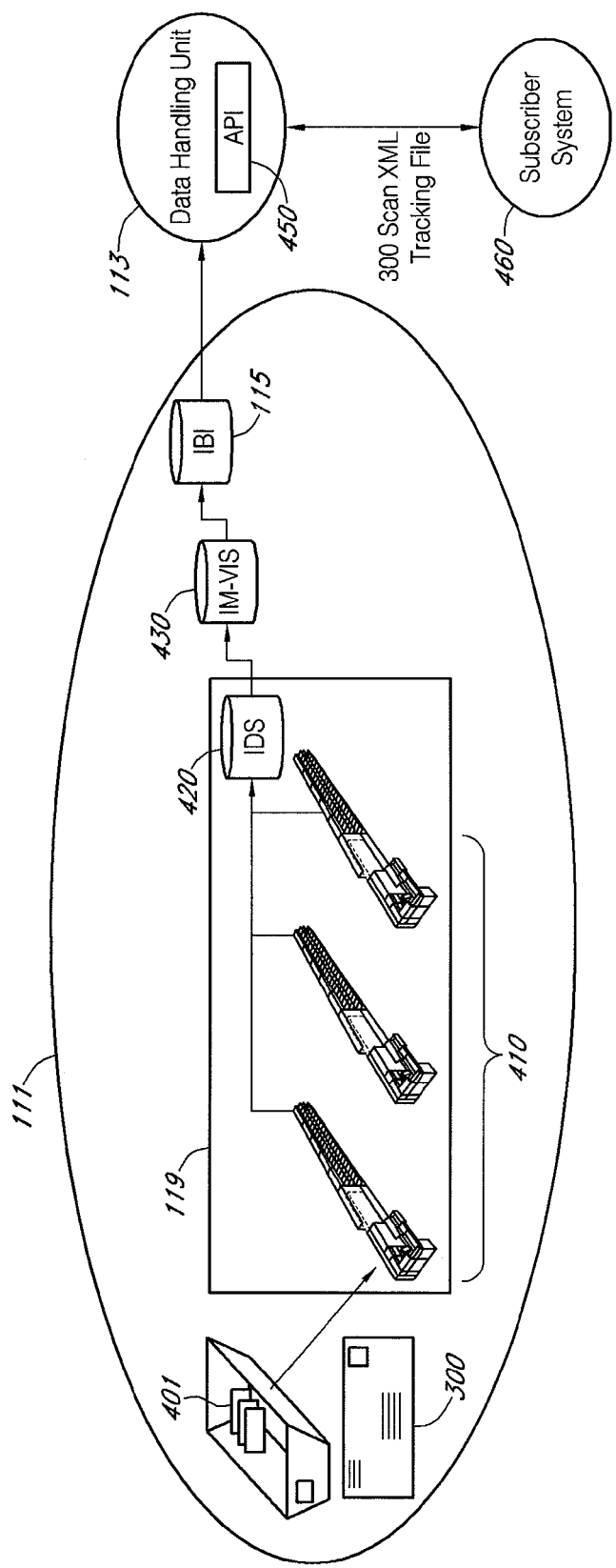
FIG. 4 is a schematic diagram illustrating generation, storage, and transmission of verification data by a delivery service according to certain embodiments.

FIG. 4 is a schematic diagram illustrating generation, storage, and transmission of verification data by a delivery service according to certain embodiments. As discussed above with reference to FIG. 1, the delivery service includes a mail processing unit 111 and a data handling unit 113. The mail processing unit 111 includes a local mail processing center 119. The local mail processing center 119 includes a series of barcode sorters 410 and a local server 420. The mail processing unit 111 also includes a regional/national server 430 and an indicia database 115. The local server 420 and/or the regional/national server 430 includes one or more databases. The local server 420 is configured to handle data communication within the local mail processing center including collecting and storing ETV-related data, e.g., verification data, generated at the barcode sorters 410 in its database. The regional/national server 430 is configured to handle data communication between a central database such as the indicia database 115. The data handling unit 113 is configured to communicate, e.g., receive and transmit data, via a subscriber system 460. The data handling unit 113 includes an application program interface (API) for providing a software application that can be used for communicating ETV-related data, e.g., verification data, with the subscriber system 460.

In operation, mail 401 collected from various mail deposit boxes is brought into the local mail processing center 119. The collected mail can include an ETV mail item 300, such as the physical embodiment of transaction verification documents (TVDs). The series of barcode code sorters 410 sort and scan barcodes printed on the collected mails. As discussed above, the ETV mail item 300 includes a unique verification ID (VID), and the VID can be part of a barcode. Therefore, as an ETV mail item, e.g., the physical embodiment of the TVD, is made to pass through the series of barcode sorters 410, the barcode on the ETV mail item is scanned and the VID extracted from the scanned data. In alternative embodiments, the physical copy of the TVD includes coded data that can be read using an optical character recognition (OCR) device. The barcode sorters 410 can also append location data and time data with the extracted VID to generate verification data. The location data can include a code indicative of the location where the ETV mail item is dispatched. In certain embodiments, the location data can include the postal zip code of the local processing center 119 where the ETV mail item is sorted and scanned by the bar code sorters. In other embodiments, the location data can include the postal zip code of the location where the physical embodiment was collected and scanned by a mail carrier. Similarly, the time data can include the time and date when the ETV mail item, e.g., the physical embodiment of the TVD, is processed by the barcode sorters at the local processing unit or when the physical embodiment was collected by the mail carrier. The verification data thus generated is written to a database by the local server 420.

In certain embodiments, the local server includes USPS's Integrated Data System (IDS) server that is configured to collect scan data, including the verification data, captured on local barcode sorters 410. The local server 420 sends the collected data including the verification data to the regional/national server 430 which immediately sends the collected data to the indicia database 115 that is configured to store indicia data collected from mail processed at various local mail processing centers in a region or a country. In certain embodiments, the local server 420 includes the USPS's proprietary IM-VIS server configured to "broker" or direct data to appropriate data systems for storage, analysis, and retrieval. In some embodiments, the indicia database 115 includes the USPS's proprietary Information Based Indicia-Revenue Protection (IBI-RP) database for storing data extracted from IBI postages such as the one shown in FIG. 2 and additional data appended at the mail processing centers. As discussed above one or more of such extracted and appended data can comprise the VIDs. A procedure is run to extract records of a registered institution from the indicia database 115, e.g., a bank, and to transmit only those records to the registered institution at times and by means jointly agreed between USPS and the registered institution. Using such a procedure on a server connected to the indicia database 115, the data handling unit 113 retrieves or receives those records constituting verification data from the IBI-RP database and programmatically transmits them to the registered institution via the API 450.

Figure 5:
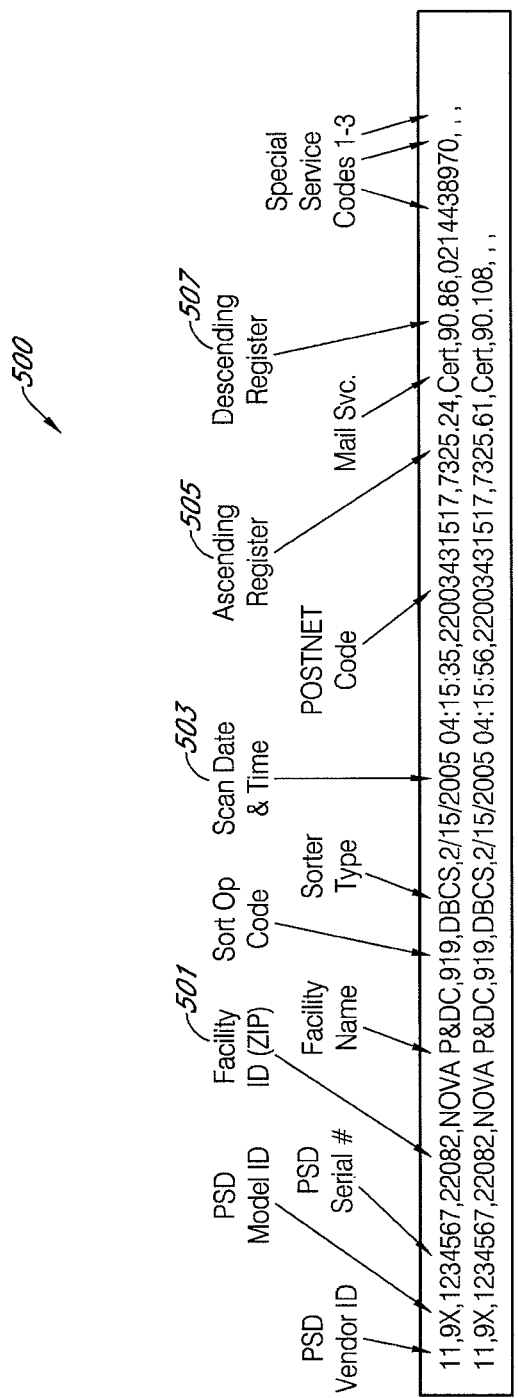
FIG. 5 shows an example of verification data transmitted to the registered institution according to certain embodiments.

FIG. 5 shows an example of verification data 500 transmitted to the registered institution according to certain embodiments. The verification data 500 includes a plurality of data elements including a facility ID 501, a scan date and time 503, an ascending register 505, and a descending register 507. The verification data includes extracted data elements such as the ascending register 505 and the descending register 507 that are extracted from the printable ETV postage such as the IBI postage 200 shown in FIG. 2 and appended data elements such as the scan date and time 503 and the facility ID 501 that are appended by the barcode sorters 410 at the local mail processing center as discussed above with reference to FIG. 4. In certain embodiments, the ascending register 505 and/or the descending register 507 comprises the VID while the facility ID 501 and the scan date and time 503 comprise the location data and the time data, respectively.

Figure 6:
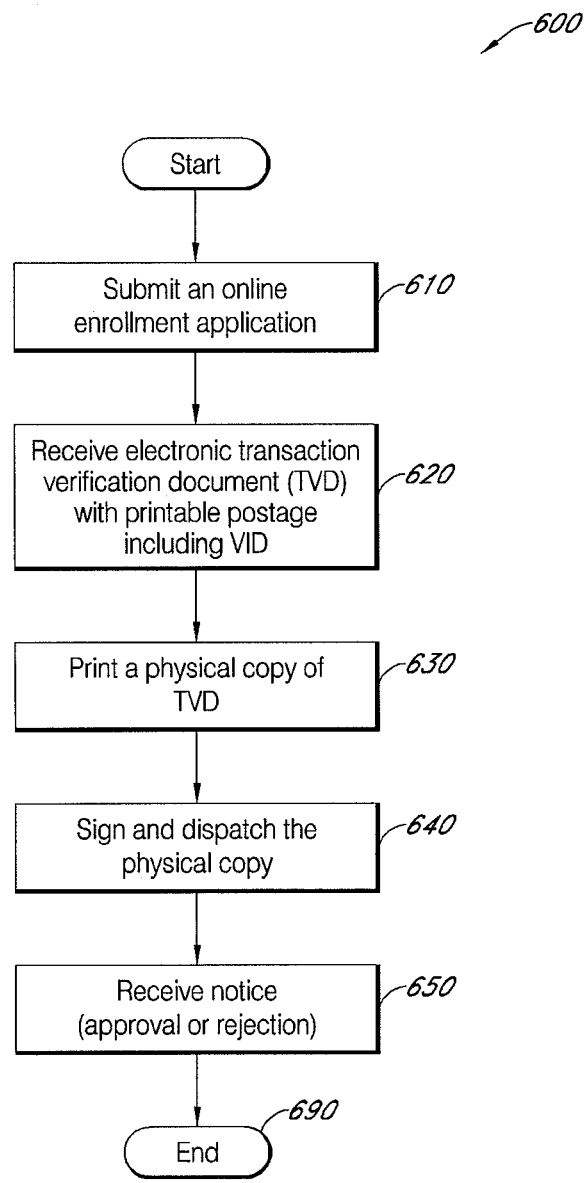
FIG. 6 is a flowchart illustrating an example ETV process from the perspective of the online applicant according to certain embodiments.

FIG. 6 is a flowchart illustrating an example ETV process from the perspective of the online applicant according to certain embodiments. The process starts at a state 610, where an online enrollment application is submitted to a registered institution by an applicant. The online application includes personal information including the name and the physical address of the applicant. In certain embodiments, the applicant can submit multiple physical addresses, e.g., the home address and the work address. The process proceeds to a state 620, where an electronic copy of transaction verification document (TVD) with a printable ETV postage is received. The printable ETV postage includes a verification VID that uniquely corresponds to the application submitted by the applicant. The electronic copy can be a pdf document sent as an e-mail attachment or a web page sent in response to a web request by the applicant. The process proceeds to a state 630, where a physical embodiment of the electronic TVD is printed by the applicant. The process proceeds to state 640, where the applicant signs and dispatches the physical embodiment to the registered institution as a mail. The process proceeds to a state 640, where a notice regarding the online enrollment application is received. The notice notifies an acceptance, a rejection, or a request for additional information. The process ends at state 690. The notice can be an e-mail or a physical mail.

Figure 7:
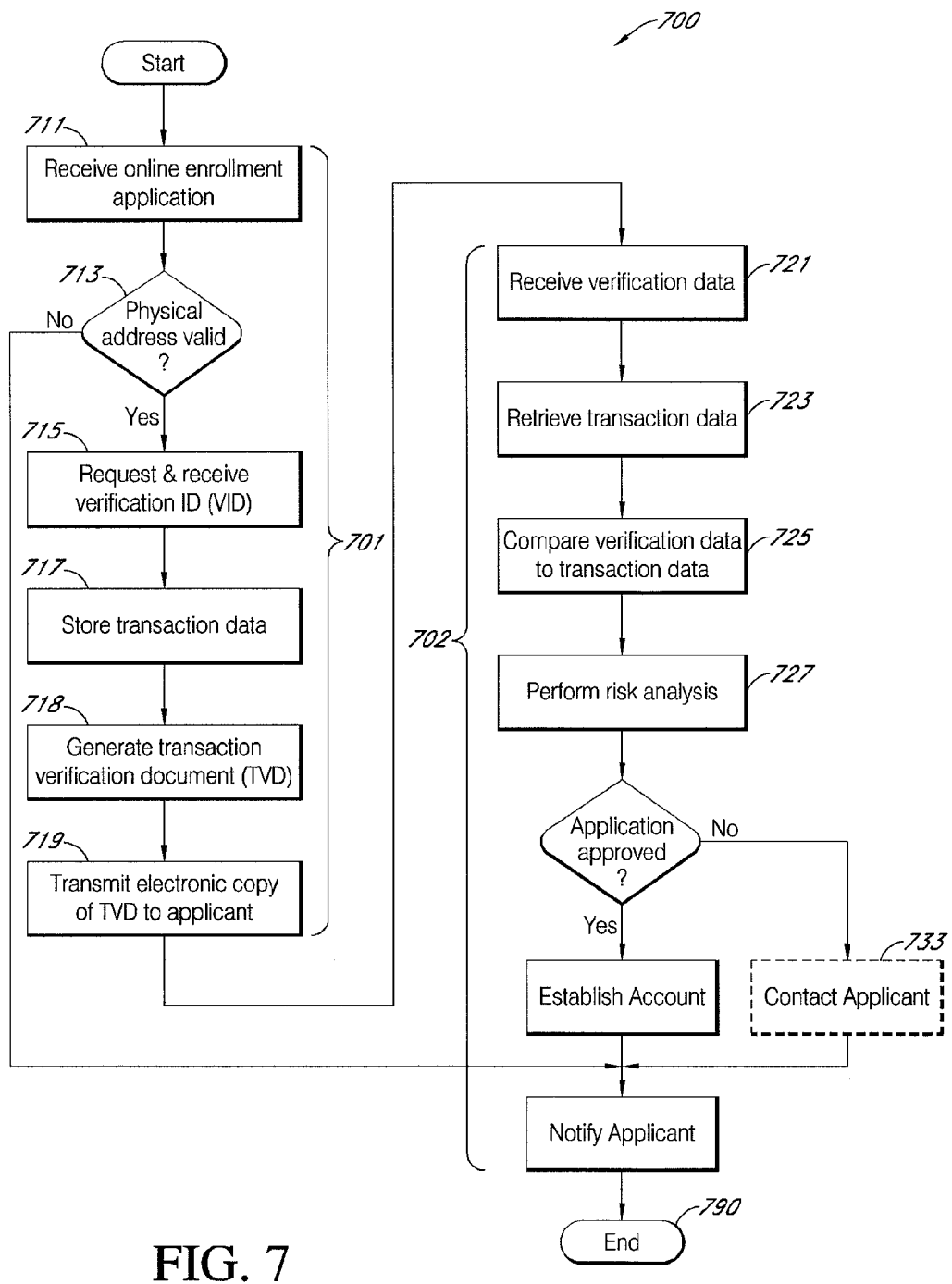
FIG. 7 is a flowchart illustrating an example ETV process from the perspective of the registered institution according to certain embodiments.

FIG. 7 is a flowchart illustrating an example ETV process 700 from the perspective of the registered institution according to certain embodiments. The example ETV process 700 includes two sub sections 701, 702. The first sub section 701 illustrates the process for generating and transmitting the transaction verification document (TVD) by the registered institution. The second sub section 702 illustrates the process for validating the applicant' physical address using the validation data received from the delivery service.

In the first sub section 701, the process 700 starts at a state 711, where the online enrollment application is received by the registered institution. The application includes personal information of the applicant including his or her name and physical address(es). The process proceeds to a decisional state 713, where it is determined whether the submitted physical address is valid with respect to the submitted name. This determination can involve referring to an existing address database that lists physical addresses of homes and businesses and their respective occupants. Alternatively, this determination can involve referring to the customer database 121 (FIG. 1) if the applicant is an existing customer of the institution. If the answer is NO (the physical address is not valid), the process ends at state 790.

If the answer is YES (the physical address is valid), the process continues at a state 715, where a request for a unique verification ID (VID) is made to a delivery service, e.g., USPS, and the VID is received. As discussed above, the VID can arrive in the form of a printable ETV postage such as the one shown in FIG. 2, wherein the barcode 210 includes one or more data elements that constitute the VID. Such printable ETV postage is electronically transmitted to the institution from the delivery service via a software application configured to handle ETV-related data communication between the delivery service and registered institutions. The process proceeds to a state 717, where transaction data including the VID and the personal information submitted by the applicant is stored in the customer database 121. The process proceeds to a state 718, where a transaction verification document (TVD) is generated. The TVD is typically generated using a macro in a word processing program such as Microsoft Word®. The macro can fetch the printable ETV postage and inserts it into the TVD. After the TVD is generated, the process proceeds to a state 719, where an electronic copy of the TVD is transmitted to the applicant.

In certain embodiments, the electronic copy is rendered in a portable document format (pdf) document created from a TVD by using a pdf conversion program such as the Acrobat PDF Writer from Adobe Systems, Inc. The TVD can be a letter such as the one shown in FIG. 3 stored in Word® format. The electronic copy, such as the pdf document, can be transmitted to the applicant's computer 131 as an e-mail attachment. In other embodiments, the electronic copy is an electronic image of a printable ETV postage that is stored in an image file format such as BMP, TIFF or JPEG. Such electronic image can be e-mailed to or downloaded from the institution's website by the applicant and printed, for example, on a label paper, peeled, and affixed to a mail item. Alternatively, the image file can be inserted into a document configured to be a mail item created by the applicant. In yet other embodiments, the electronic copy is an instance of the TVD document itself, e.g., a Word® document. In other embodiments, the electronic copy can be a web page, written in a markup language such as Hypertext Markup Language (HTML), that is transmitted to the applicant's computer via the Internet when the applicant makes a request for the TVD at the institution's website. In such embodiments, the web page or a portion of it can be printed and mailed.

Turning to the second sub section 702 of the ETV process 700, the process resumes, after transmitting the electronic copy of the TVD, at a state 721, where verification data is received from the delivery service. The verification data includes the VID extracted from an ETV mail item, e.g., the physical embodiment of the TVD, dispatched by the applicant, and location data and time data appended by a mail processing equipment such as the barcode sorters. The location data is indicative of the location where the ETV mail item is dispatched by the applicant. The location data can include a zip code of the local mail processing center 119 or a zip code of where the ETV mail item was collected, e.g., a residential mail box or a USPS collection station. The time data is indicative of the time and date when the ETV mail item was dispatched by the applicant. The time data can include time and date when the ETV mail item was processed by barcode sorters at the local mail processing center or when the ETV mail item was collected and scanned a collection point such as at a residential mail box or a USPS collection station. The process proceeds to a state 723, where the transaction data corresponding to the online application is retrieved from a database such as the customer database 121 using the unique VID. As discussed above, the transaction data includes personal information of the online applicant including the physical address to be verified. The transaction data can also include a transaction time, e.g., the time and date when the online application was submitted to or processed by the institution or when the electronic copy of the TVD was transmitted to the applicant.

The process proceeds to a state 725, where the verification data are compared to the transaction data. This comparison between the verification data and the transaction data can involve a geographical comparison between the physical address (part of the transaction data) and the location data (part of the verification data). The geographical comparison can include determination as to whether there is an expected match between the physical address and the location data. For example, if the location data corresponds to the postal zip code of the residential mail box where the physical embodiment was collected, the comparison can involve a determination as to whether the zip code of the mail box is the same as the zip code part of the physical address submitted by the applicant. On the other hand, if the location data indicates the local mail processing center where the physical embodiment was processed, the comparison can involve determination as to whether the local mail processing center is assigned to collect mails from the physical address or its vicinity. If the online application had listed multiple physical addresses, e.g., a residential address and a work address, the analyses described above are performed with respect to each of the physical addresses. This comparison between the verification data and the transaction data can also involve a temporal comparison between the transaction time (e.g., when the electronic copy of the TVD was transmitted to the applicant) and the time data indicative of when the physical embodiment of the TVD was dispatch. The temporal comparison can include determination as to whether the physical embodiment was dispatched within an expected time window after the electronic copy was transmitted to the applicant.

The process proceeds to a state 727, where a risk analysis is performed with respect to the outcome of the comparison at the state 725. In certain embodiments, the risk analysis is performed by custom software developed by the registered institution. In other embodiments, the risk analysis can be performed using one or more commercially available risk analysis tools. The risk analysis can be based on models having varying levels of sophistication. In the simplest model, for example, the physical address can be validated if and only if there is an expected match between the physical address and the location data. In more sophisticated models, the risk analysis can involve computing a degree of mismatch between various elements of the verification data and the transaction data and setting a tolerance threshold. For example, the risk analysis can authenticate the physical address if the physical address is within 10 miles from the USPS collection station where the physical embodiment was collected and scanned. Also, the risk analysis can involve an inquiry as to whether the collection point, e.g., the USPS collection station, is located in an expected travel route between the residential address and the work address submitted by the applicant. The expected travel route can be deduced from other sources. For example, if the applicant is an existing credit card customer applying for an additional card, the expected travel route can be deduced from locations, e.g., gas stations, where the applicant frequently made prior transactions using the existing credit card. In some embodiments, tolerance threshold for ETV can be based on a combination of parameters such as the distance mismatch, the time mismatch, and the expected travel route. In other embodiments, the risk analysis and the attendant tolerance threshold can also be dependent on factors not relating to the ETV mail processing. For example, the risk analysis can take the requested credit limit for a credit card into account in establishing the tolerance threshold. The higher the requested credit card limit, the greater the risk to the bank issuing the credit card. Therefore, the threshold, such as the distance threshold, can be adjusted, e.g., reduced, to compensate for the increased risk. In general, the risk analysis involves analyzing one or more parameters and criteria in order to assess risk associated with a transaction, e.g., an issuance of a credit card with $10,000 credit limit, for which the application is submitted by the online applicant. The assessed risk is used to determine the approval or rejection of the application.

After the risk analysis is performed, the process proceeds to a decisional state 729, where it is determined whether the online application is approved. This determination is based at least in part on the results of the comparison at the state 725 and/or the risk analysis at the state 727. If the answer is YES, the process moves to a state 731, where the enrollment account, for which the applicant submitted the online application, is established. If the answer is NO, the process moves to an optional state 733, where the applicant is personally contacted by a representative to find out, for example, whether an incorrect physical address or other personal information was mistakenly entered by the applicant. In either YES or NO case, the process moves to a state 735, where the applicant is notified of the result of the online enrollment application. The process ends at state 790.

Figure 8:
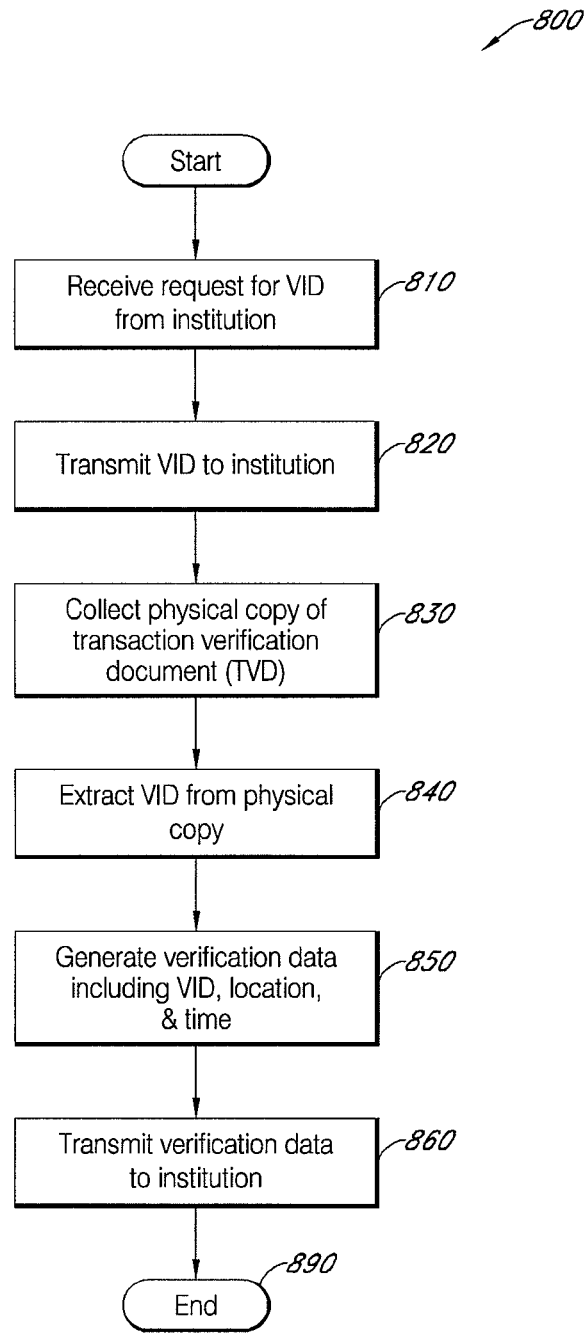
FIG. 8 is a flowchart illustrating an example ETV process from the perspective of the delivery service according to certain embodiments.

FIG. 8 is a flowchart illustrating an example ETV process 800 from the perspective of the delivery service according to certain embodiments. The example ETV process 800 starts at a state 810, where a request for a VID is received from a registered institution. The process proceeds to a state 820, where the requested VID is transmitted to the institution as part of a printable ETV postage such as the one shown in FIG. 2. The process proceeds to a state 830, where a physical embodiment of TVD is collected. The physical embodiment bears the printable ETV postage that includes the VID. The process moves to a state 840, where the VID is extracted from the physical embodiment at the mail processing center 119 (FIG. 1) via one or more barcode sorters. The process moves to a state 850, where a verification data is generated by appending location data and time data by the one or more barcode sorters. The location data and the time data indicate where and when the physical embodiment was processed, respectively, at the mail processing center. The verification data thus generated is transmitted to and stored in a regional or national indicia database 115 (FIG. 4). The process proceeds to a state 860, where the verification data is transmitted to the registered institution. The process ends at state 890.

Figure 9:
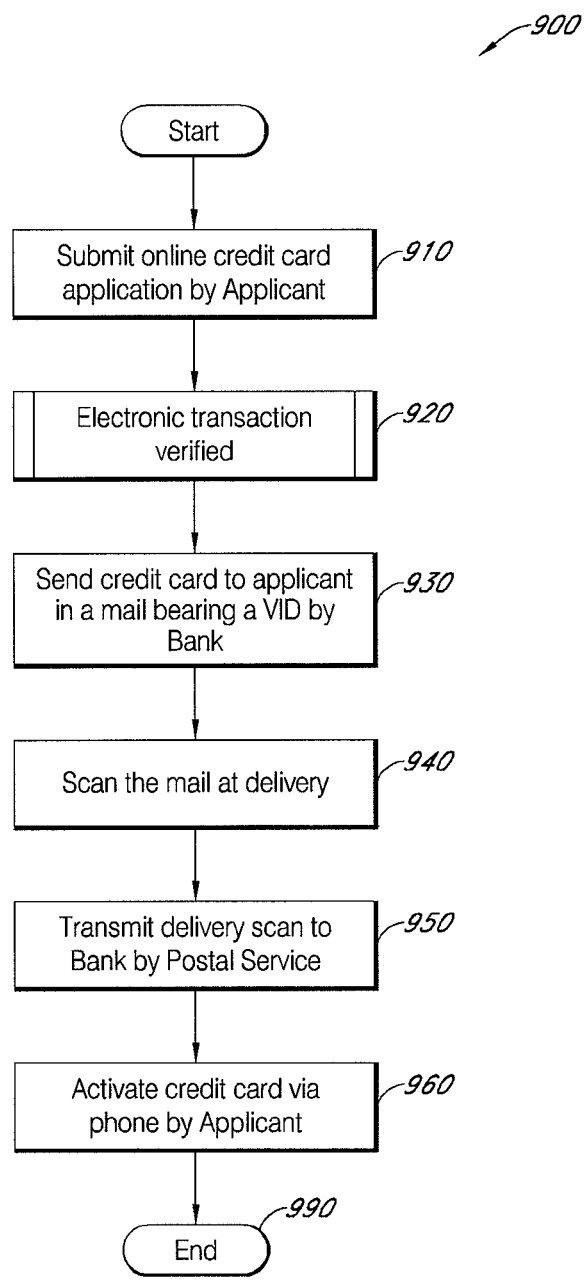
FIG. 9 is a flowchart illustrating an example process for confirming delivery of a credit card before activation according to certain embodiments.

FIG. 9 is a flowchart illustrating an example process for confirming delivery of a credit card before activation according to certain embodiments. The process starts at a state 910, where the applicant submits an online credit card application to a bank. The process proceeds to a state 920, where the online application, including the submitted physical address, is verified and approved via processes substantially similar to the ETV processes described above with reference to FIGS. 6, 7, and 8. Having the application approved, the applicant is now a new customer of the bank. The process proceeds to a state 930, where a credit card is sent to the applicant in a postal mail item bearing a printable ETV postage that includes a VID. This VID can be same as the VID used for the online application verification or can be a new VID issued by the postal service. The process proceeds to a state 940, where the postage including the VID is scanned at delivery. In certain embodiments, this delivery scan is performed at the mail processing center that processes mails delivered to the applicant. Alternatively, the delivery scan is performed by a mail carrier as the mail is delivered to the residence or the workplace of the applicant. The process proceeds to a state 950, where the delivery scan data is transmitted to the bank by the delivery service. The process proceeds to a state 960, where the credit card is activated via phone by the applicant.

The methods described above are implemented via one or more computers configured to execute one or more computer program embodying the desired method. The computer programs can be provided as computer program products comprising a computer useable medium having computer program logic recorded thereon, which when executed by a computer processor configured to execute the same, performs an authentication method according to the invention. The computer program logic can comprise computer program code logic configured to perform a series of operations required to implement the particular embodiment desired. Computer usable medium refers to any medium or device that can be used to provide software or program instructions to a computer or computer system, and includes media such as removable data storage devices. The computer usable medium also includes a machine readable medium comprising instructions for performing an authentication method according to the invention that upon execution causes a machine to execute the authentication method. As those in the art will appreciate, the embodiments, features, and functionality of the development as described are not dependent on particular computer system or processor architecture or on a particular operating system. The development can also be implemented using other computer or processor systems and/or architectures.

Computer programs or computer control logic can be stored in a memory in communication with the processor(s) intended to execute the program or can be received via any suitable communications interface. Computer programs executed according to the invention can enable the computer system to perform the desired functions. In embodiments where the methods of the development are implemented using software, the software can be stored in, or transmitted via, a computer program product and loaded into a computer system using any suitable approach, including a removable storage device, hard drive, or communications interface. When the control logic or software is executed by the processor(s), the processor(s) are caused to perform the functions of the invention. In other embodiments, the invention is implemented primarily in hardware using, for example, hardware components such as PALs, application specific integrated circuits (ASICs), or other hardware components. Implementation of a hardware state machine so as to perform the functions described herein will be apparent to persons skilled in the relevant art(s). In another embodiment, elements are implemented using a combination of both hardware and software.

The development illustratively described herein suitably may be practiced in the absence of any element(s) not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the development has been specifically disclosed by certain embodiments and optional features, modification and variation of the concepts herein disclosed may be resorted to by those skilled in the art, and that such modifications and variations are considered to be within the scope of this invention as defined by the appended claims.

What is claimed is:

1. A method of authenticating a physical address in an online communication, the method comprising:
   receiving, from a first entity, at a processing facility, a request for information verifying identity of a second entity;
   generating, by a processor, a verification identification (VID) in response to the request for the information, the VID including information identifying the second entity, and the VID being associated with a defined geographic area;
   electronically transmitting the VID to the first entity;
   receiving, at the processing facility, a physical embodiment of a transaction verification document (TVD) comprising an indicia indicative of the VID and information related to a location from which the physical embodiment of the TVD was dispatched, the physical embodiment having been dispatched by an entity, the entity being other than the first entity, from a location within the defined geographic area and remote from the processing facility;
   extracting, by a processor, the VID from the physical embodiment of the TVD;
   generating verification data based on the extracted VID and the location from which the physical embodiment of the TVD was dispatched; and
   transmitting the verification data to the first entity.

2. The method of claim 1, wherein transmitting the VID comprises transmitting the indicia indicative of the VID.

3. The method of claim 1, wherein the indicia indicative of the VID comprises a printable postage.

4. The method of claim 3, wherein the printable postage comprises a non-human readable coded data, wherein the non-human readable coded data comprises a barcode or a data glyph indicative of the VID.

5. The method of claim 3, wherein the printable postage comprises at least one of Information Based Indicia (IBI) data and Intelligent Mail Barcode®.

6. The method of claim 1, wherein extracting the VID comprises reading a coded data on the physical embodiment by a barcode sorter.

7. The method of claim 1, wherein extracting the VID comprises reading a coded data on the physical embodiment by a handheld scanner.

8. The method of claim 1, wherein the processing facility is a delivery service.

9. The method of claim 8, wherein the delivery service is a postal service.

10. The method of claim 1, wherein the location data comprises a code indicative of a processing location where the physical embodiment was processed.

11. The method of claim 10, wherein the processing location is one of a local mail processing facility and a mail collection point.

12. The method of claim 10, wherein the code comprises a postal zip code.

13. The method of claim 1, wherein the verification data further comprises time data indicative of the time at which the physical embodiment was dispatched.

14. The method of claim 13, wherein the time data comprises the time and date when the physical embodiment was processed.

15. The method of claim 9, wherein the physical embodiment of the TVD comprises a postal mail.

16. An apparatus for authenticating a physical address in an online communication, the apparatus comprising:
   at least one processor configured to:
      receive from an institution, at a processing facility, a request for information verifying identity of a second entity;
      generate a verification identification (VID) in response to the request for the information, the VID including information identifying the second entity, and the VID being associated with a defined geographic area; and
      electronically transmit an indicia indicative of the VID to the institution; and
   one or more readers configured to extract from a physical embodiment of a transaction verification document (TVD) one or more data elements indicative of the VID and information related to a location from which the physical embodiment of the TVD was dispatched, the physical embodiment having been dispatched by an entity other than the institution, from a location within the defined geographical area and remote to the processing facility;
   wherein the at least one processor is further configured to:
      generate verification data based on the one or more data elements extracted from the TVD and the location from which the physical embodiment of the TVD was dispatched, and
      transmit the verification data to the institution.

17. The apparatus of claim 16, wherein the indicia indicative of the VID includes a printable postage.

18. The apparatus of claim 17, wherein the printable postage comprises at least one of Information Based Indicia (IBI) data and Intelligent Mail Barcode®.

19. The apparatus of claim 16, wherein the at least one processor includes a server configured to collect data in a local mail processing center.

20. The apparatus of claim 16, wherein the one or more readers include one of a barcode sorter, a handheld barcode scanner, and an optical character recognition (OCR) device.

21. An apparatus for authenticating a physical address in an online communication, the apparatus comprising:
   means for receiving from an institution, at a processing facility, a request for information verifying identity of a second entity;
   means for generating a verification identification (VID) in response to the request for the information, the VID including information identifying the second entity and the VID being associated with a defined geographic area;
   means for electronically transmitting an indicia indicative of the VID to the institution;
   means for extracting from a physical embodiment of a transaction verification document (TVD) one or more data elements indicative of the VID and information related to a location from which the physical embodiment of the TVD was dispatched, the physical embodiment having been dispatched by an entity other than the institution, from a location within the defined geographic area and remote to the processing facility;
   means for generating verification data based on the one or more data elements extracted from the TVD and the geographic area from which the physical embodiment of the TVD was dispatched; and
   means for transmitting the verification data to the institution.

* * * * *